UNITED STATES PATENT OFFICE.

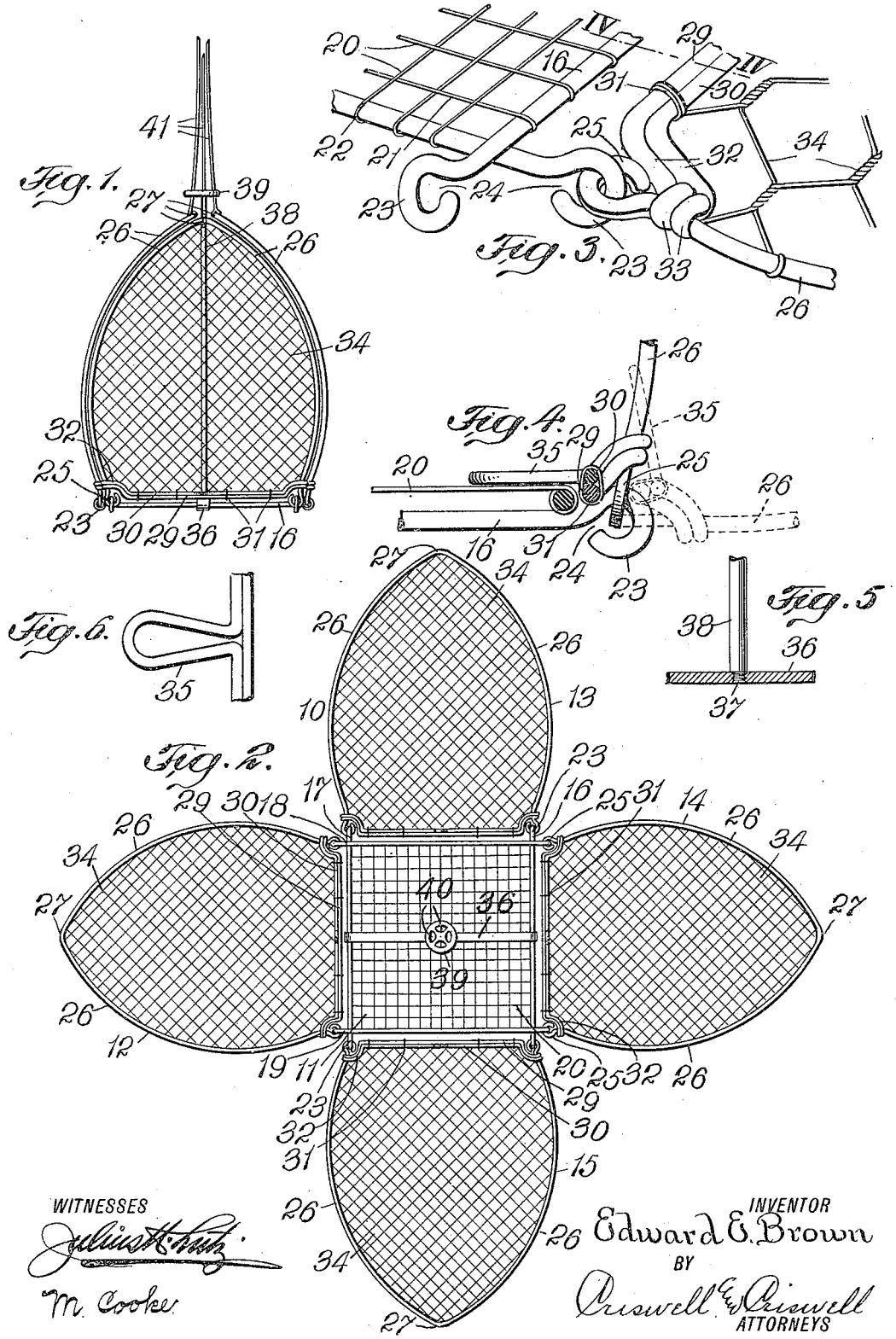

EDWARD E. BROWN, OF NEW YORK, N. Y.

NET.

953,255.

Specification of Letters Patent.

Patented Mar. 29, 1910.

Application filed February 2, 1909. Serial No. 475,641.

*To all whom it may concern:*

Be it known that I, EDWARD E. BROWN, a citizen of the United States, and a resident of New York, county and State of New York, have invented certain new and useful Improvements in Nets, of which the following is a full, clear, and exact description.

This invention relates more particularly to a net for catching crabs and other marine objects.

The primary object of the invention is to provide a simple and efficient device which is adapted to be lowered into the water, and when it strikes the bed or bottom of the river or other place in which it may be used, it will automatically open to permit crabs or other objects to enter the net in an effort to get the bait which may be supported or held on the bottom member of said device, and which will readily permit the closing members to be moved in such a way as to close the sides of the device and form a receptacle or inclosure from which the crabs or other objects cannot escape.

Another object of the invention is to provide a simple and efficient device which may be readily constructed and assembled, and which may be made substantially entirely of wire.

The further object of the invention is to provide a simple knockdown device in which the parts may be readily taken apart for shipment, storage, or other purposes.

With these and other objects in view, the invention will be hereinafter more particularly described with reference to the accompanying drawings, which form a part of this specification, and will then be pointed out in the claims at the end of the description.

In the drawings, Figure 1 is an elevation of one form of device embodying my invention, showing the same in a closed position. Fig. 2 is a plan view of the device in an open position. Fig. 3 is a fragmentary perspective view of one part of the device when in an opening position, showing how the members are pivotally and detachably held together. Fig. 4 is an enlarged fragmentary section taken on the line IV—IV of Fig. 3, showing one of the side members in full lines in its closed position, and by dotted lines in its open position or that shown in Fig. 3. Fig. 5 is a fragmentary section showing the guide rod or member, and how the same may be removably held as a part of the device. Fig. 6 is a fragmentary detail view of the device for forcing the side members apart.

The device may be variously constructed, and while the same is shown in the most part as constructed of wire, it will be understood that the same may be of any suitable material. As shown the device 10 is constructed of a bottom member 11 and side members 12, 13, 14, and 15. The bottom member is substantially square or rectangular and is provided with four intersecting wire rods 16, 17, 18, and 19 which form the side edges of the bottom and these rods or wires are held together by a coarse wire mesh 20. This wire mesh 20 is formed by wires 21 and 22, which are intertwined and their ends passed about the rods 16 to 19, and where the rods intersect each other as well as the wire, they may be soldered or otherwise held, as by galvanizing, so that a substantial and rigid bottom or member is provided. Each of the rods 17 to 19 have their ends provided with a hooked portion 23 which is separated at its end from the body of the rods so as to provide a space 24 in which the hooked end 25 of the marginal wire rod 26 of each side member is adapted to pass so that each of said side members will be pivotally held to the bottom member and in such a way that if swung backward a sufficient distance, it may be detached from said bottom member 11.

The side members 12 to 15 each has its wire rod 26 substantially triangular in form, and each frame is concaved so that the apexes 27, when the members are in the position shown in Fig. 1, will substantially meet to form a receptacle, and the side frames formed in part by the marginal wires 26 will abut against the frame of the adjacent member so that it will substantially close the edges thereof, except, of course, so far as the sides are open by reason of the wire mesh used as a part of the construction of the device.

Each side member has the inner ends of its frame rod or wire 26 held together adjacent to the pivoting point by two transversely extending wire rods 29 and 30. These two rods are united together by twisting a wire about the same, as 31, and each of the rods 29 and 30 have their outer ends projecting outwardly, as at 32, and are provided with hooked ends 33, by which the frame member 26 is rigidly held together, and between the frame member of marginal wire 26 forming an open body for the frame is the intertwined wire mesh 34 which is held to the frame and wires thereof, so as to bind the same and hold the parts of the frame together. Each of the wires 30 are provided substantially centrally thereto with a substantially U-shaped part 35, as shown best in Figs. 4 and 6, which is adapted to engage a part of the bottom when the sides are in a raised position, as shown in Fig. 1 and this part 35 and the body of the rods 30 are so constructed and positioned that they will act as a spring so that when the sides are released, as will be presently described, the said sides will move to an open position.

A bar 36 extends across the bottom member and is connected to the rods 16 and 17 forming the frame of the bottom, and said bar is provided with a threaded opening in which the threaded end 37 of a rod 38 is adapted to be detachably held. This rod 38 is provided with a circular member 39 in which are a plurality of openings 40 through which a cord or other flexible connection 41 may be passed, one for each side, and at the end of said cord or flexible connection secured to each of the said members.

As will be seen when the device is lowered in the water and reaches the bed or bottom and the cord 41 released, the spring part 35 of the rod member will force the side members beyond the center of gravity to permit them to move to an open position, and when the cords or connections 41 are drawn together, the sides will be swung on their pivots to the position shown in Fig. 1, thus catching the crabs or other objects that may be contained therein, and the device may then be raised out of the water.

From the foregoing it will be seen that a simple and efficient device is provided which is adapted to catch crabs and other objects; that said device may be readily constructed and assembled and is adapted to be taken apart and placed in a knockdown position for transportation, storage, or other purposes; and that said device is not likely to become disarranged or difficult of manipulation while in use.

Having thus described my invention I claim as new and desire to secure by Letters Patent:—

1. A device of the character described, comprising a bottom member having intersecting wires forming a frame each having a hooked outer end, a plurality of substantially triangular and curved side members, each having a frame formed by a marginal substantially V-shaped wire provided with hooked ends adapted to engage the hooked ends of the intersecting wires of the bottom members to be pivotally held thereto, and transversely extending wires joining the marginal wire together adjacent to the pivots, one of said transverse wires of each side having an inward projecting portion adapted to engage a part of the bottom member and serve as a spring to force said side to an open position, interwoven wire closing the space between the sides of the frames, and means whereby the sides may be raised or lowered on their pivots.

2. A device of the character described, comprising a rectangular bottom member having intersecting wires forming a frame each having a hooked outer end, four substantially triangular sides, pivoted to the hooked ends of the wires and having a frame formed by a marginal wire and a transversely extending wire joining the marginal wires together adjacent to the pivots, and means whereby the sides may be raised or lowered on their pivots.

3. A device of the character described, comprising a bottom member, a plurality of side members pivotally held to the bottom members each side having a frame formed by a marginal wire and transversely extending wire joining the marginal wires adjacent to the pivots, one of said transverse wires having an inward projecting portion adapted to engage a part of the bottom member and serve as a spring to force a side toward an open position, and means for moving the sides on their pivots.

4. A device of the character described, comprising a bottom member having a frame provided with open hooked ends at its corners, and a plurality of sides each having hooked portions adapted to be detachably held in the hooked ends of the bottom member and be pivoted thereto, and means for moving the sides on their pivots.

5. A device of the character described, comprising a rectangular bottom member having open hooked portions at its corners and four substantially triangular and curved sides having hooked portions adapted to detachably engage the hook portions of the bottom and be pivoted thereto, and means for moving the sides on their pivots.

This specification signed and witnessed this 30th day of January A. D. 1909.

EDWARD E. BROWN.

Witnesses:
W. A. TOWNER, Jr.,
M. COOKE.